(12) United States Patent
Tarandek et al.

(10) Patent No.: US 11,667,270 B2
(45) Date of Patent: Jun. 6, 2023

(54) FLOOR MOUNTED BRAKE PEDAL

(71) Applicant: HL MANDO CORPORATION, Gyeonggi-do (KR)

(72) Inventors: Kristijan Tarandek, Neu-Isenburg (DE); Josko Kurbasa, Waldsolms (DE); Hans Joerg Feigel, Rosbach (DE)

(73) Assignee: HL MANDO CORPORATION, Gyeonggi-Do (KR)

( * ) Notice: Subject to any disclaimer, the term of this patent is extended or adjusted under 35 U.S.C. 154(b) by 102 days.

(21) Appl. No.: 17/436,578

(22) PCT Filed: Mar. 6, 2020

(86) PCT No.: PCT/KR2020/003152
§ 371 (c)(1),
(2) Date: Sep. 3, 2021

(87) PCT Pub. No.: WO2020/180141
PCT Pub. Date: Sep. 10, 2020

(65) Prior Publication Data
US 2022/0144224 A1    May 12, 2022

(30) Foreign Application Priority Data
Mar. 6, 2019   (DE) .......................... 102019203089.0

(51) Int. Cl.
*B60T 7/04*   (2006.01)
*B60T 7/06*   (2006.01)
(Continued)

(52) U.S. Cl.
CPC ................ *B60T 7/042* (2013.01); *B60T 7/06* (2013.01); *G05G 1/01* (2013.01); *G05G 1/38* (2013.01);
(Continued)

(58) Field of Classification Search
CPC .................................. G05G 1/01; G05G 1/40
See application file for complete search history.

(56) References Cited

U.S. PATENT DOCUMENTS 6,364,047 B1 *   4/2002   Bortolon ................ B60K 23/02
                                                        74/513
6,367,886 B1      4/2002   Shaw
(Continued)

FOREIGN PATENT DOCUMENTS

JP      07-191773           7/1995
KR   10-2018-0094187        8/2018

OTHER PUBLICATIONS

International Search Report for PCT/KR2020/003152 dated Jun. 22, 2020 (now published as WO 2020/180141).
(Continued)

*Primary Examiner* — Vicky A Johnson
(74) *Attorney, Agent, or Firm* — Ladas & Parry, LLP

(57) ABSTRACT

The invention relates to a floor mounted brake pedal for an electrically controlled vehicle brake, comprising a first pedal lever, a second pedal lever arranged in front of the first pedal lever, a pedal platform having a stepping area and a shaft protruding from the stepping area in a forward direction, a first pedal sensor for detecting a position of the brake pedal, and a second pedal sensor for independently detecting the position of the brake pedal.

15 Claims, 23 Drawing Sheets

(51) Int. Cl.
  *G05G 1/01* (2008.04)
  *G05G 1/38* (2008.04)
  *G05G 1/40* (2008.04)
  *G05G 1/44* (2008.04)
  *G05G 5/03* (2008.04)
  *B60K 26/02* (2006.01)

(52) U.S. Cl.
  CPC .............. *G05G 1/40* (2013.01); *G05G 1/44* (2013.01); *G05G 5/03* (2013.01); *B60K 26/02* (2013.01); *B60T 2270/413* (2013.01); *B60T 2270/414* (2013.01); *B60T 2270/82* (2013.01); *G05G 2505/00* (2013.01)

(56) References Cited

U.S. PATENT DOCUMENTS

| | | | |
|---|---|---|---|
| 7,946,192 B2 * | 5/2011 | Kim | B60K 26/02 74/513 |
| 2002/0157497 A1 * | 10/2002 | Porter | G05G 1/405 74/512 |
| 2013/0282249 A1 | 10/2013 | Heise et al. | |
| 2016/0202719 A1 | 7/2016 | Lippman et al. | |

OTHER PUBLICATIONS

Written Opinion of the International Searching Authority for PCT/KR2020/003152 dated Jun. 22, 2020 (now published as WO 2020/180141).

* cited by examiner

【Figure 1】
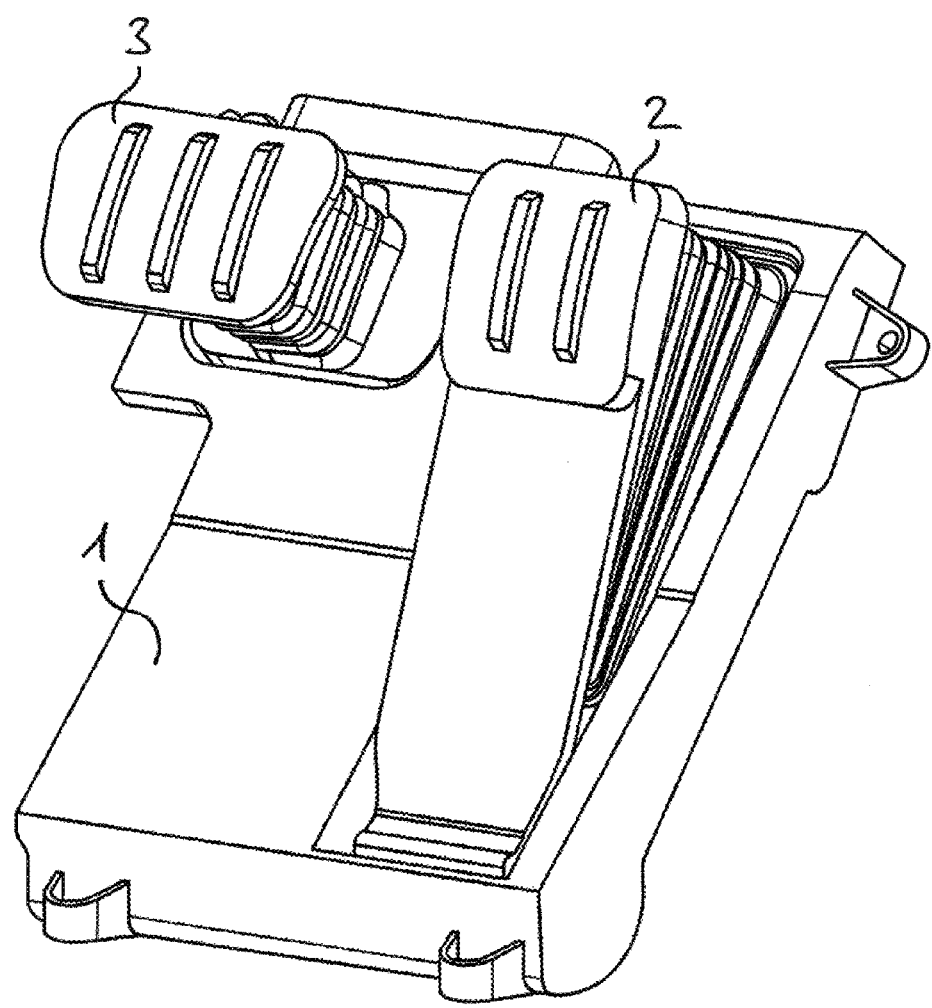

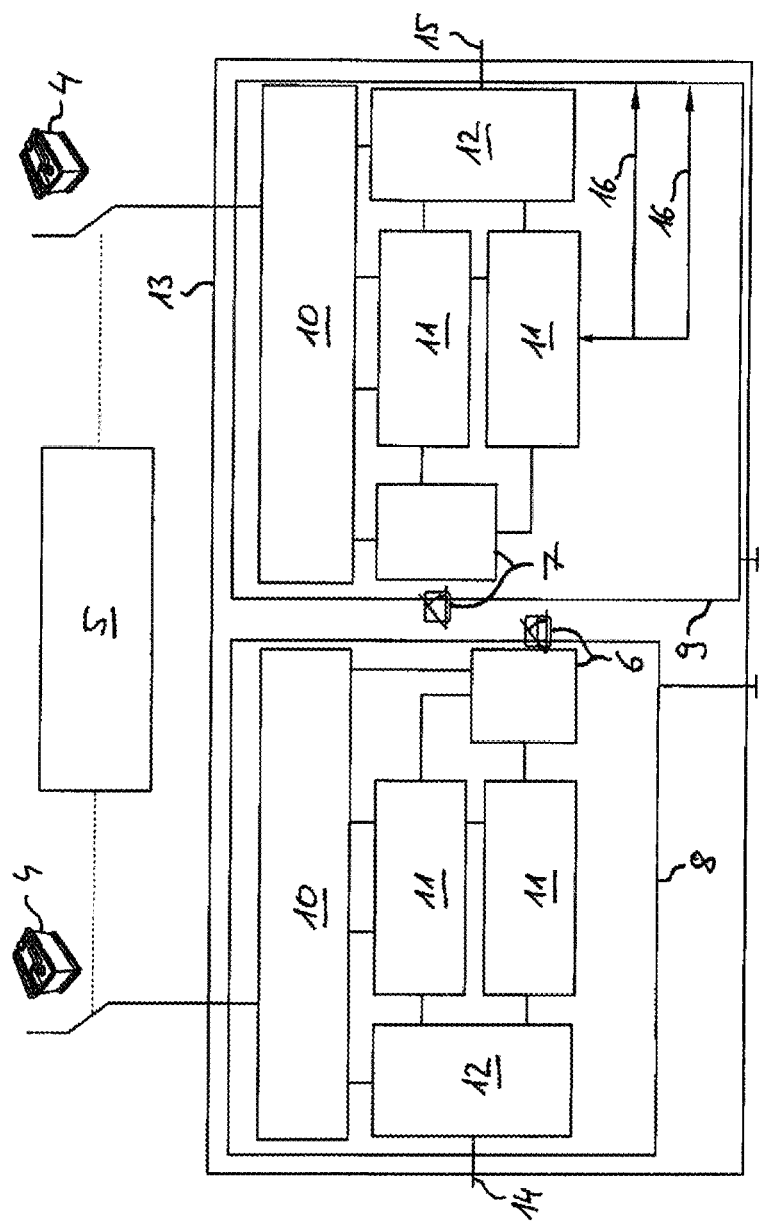
[Figure 2]

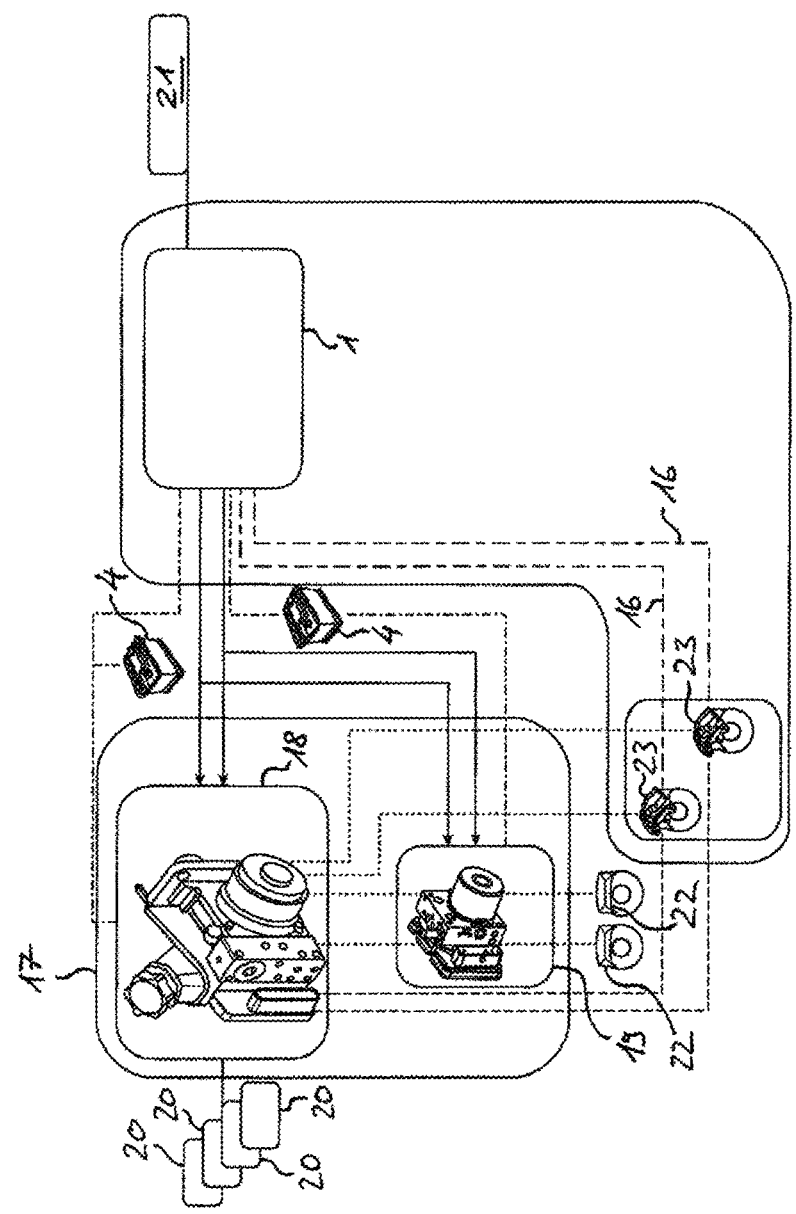
[Figure 3]

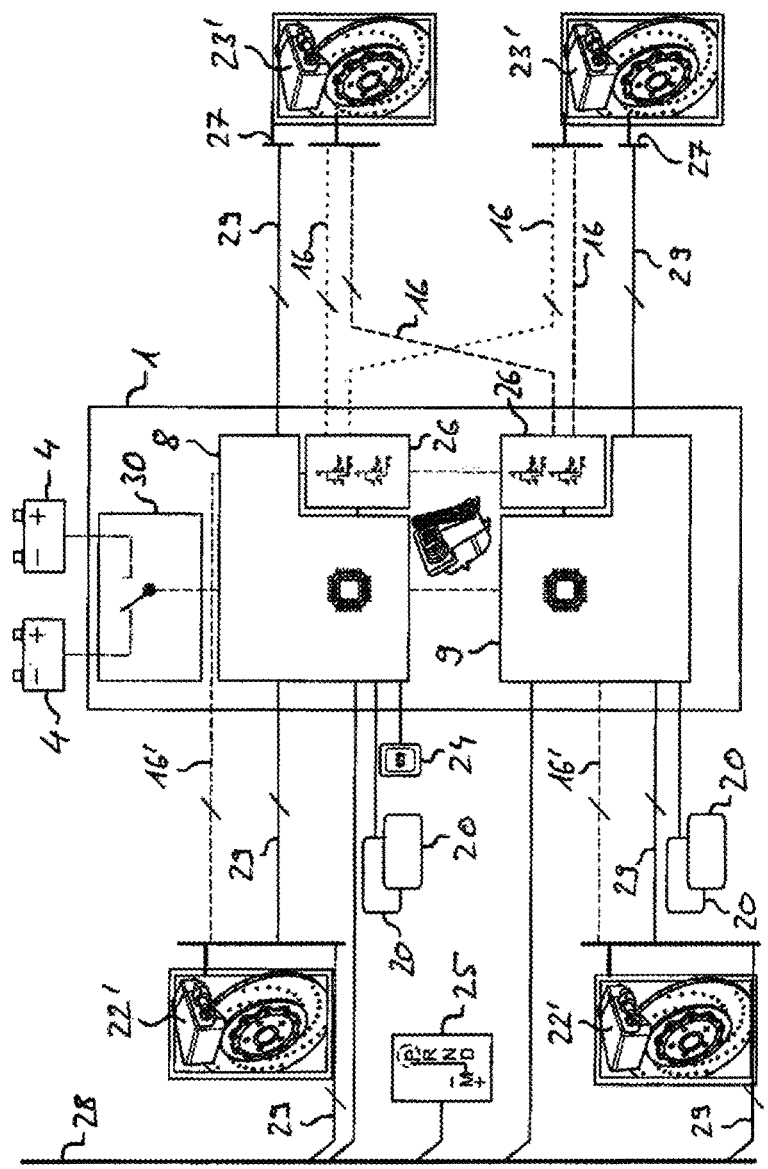
[Figure 4]

[Figure 5]
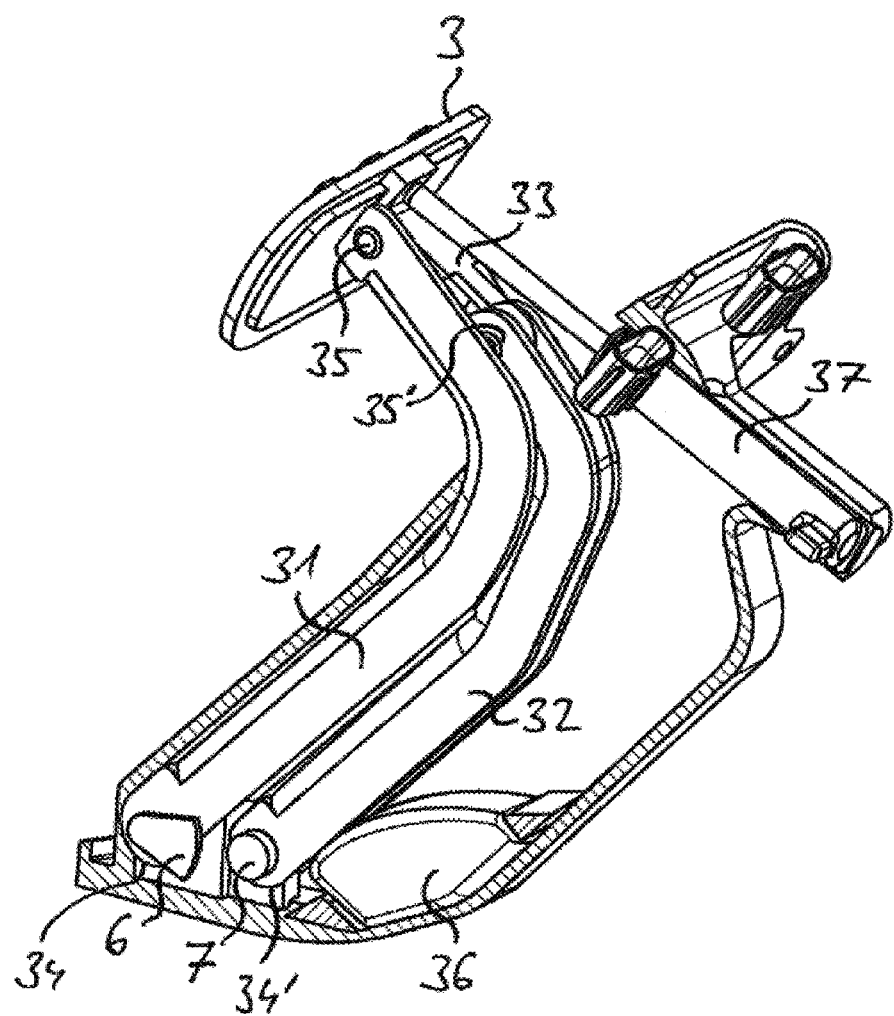

[Figure 6]
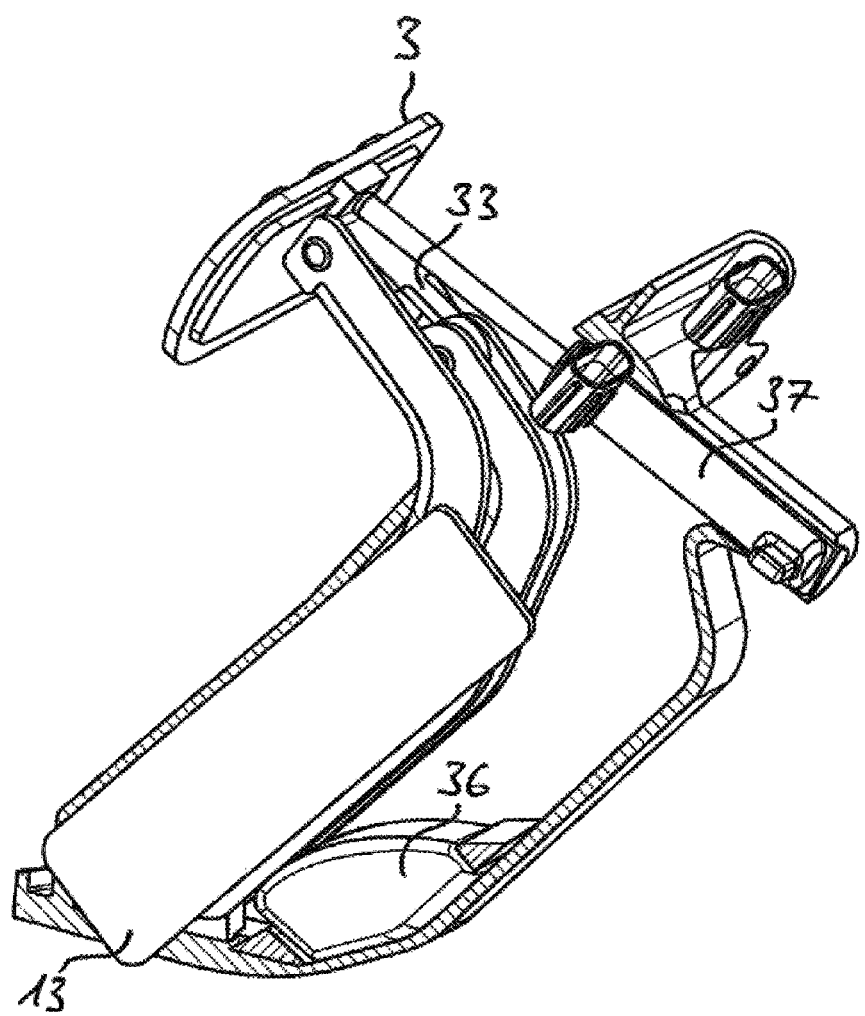

[Figure 7]
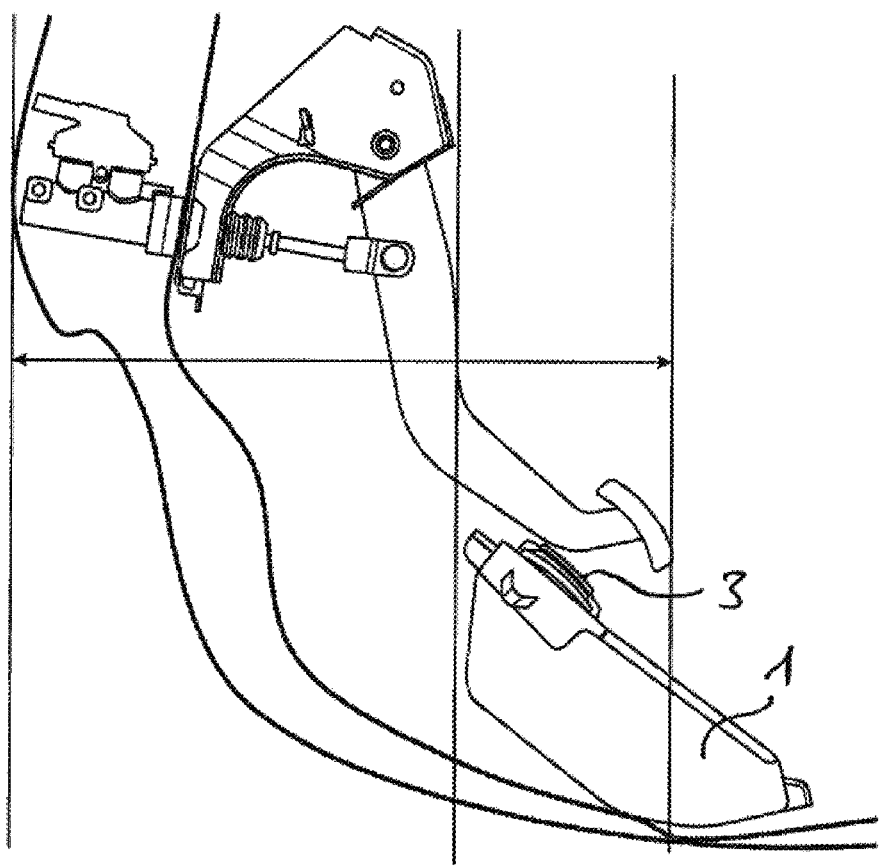

[Figure 8]
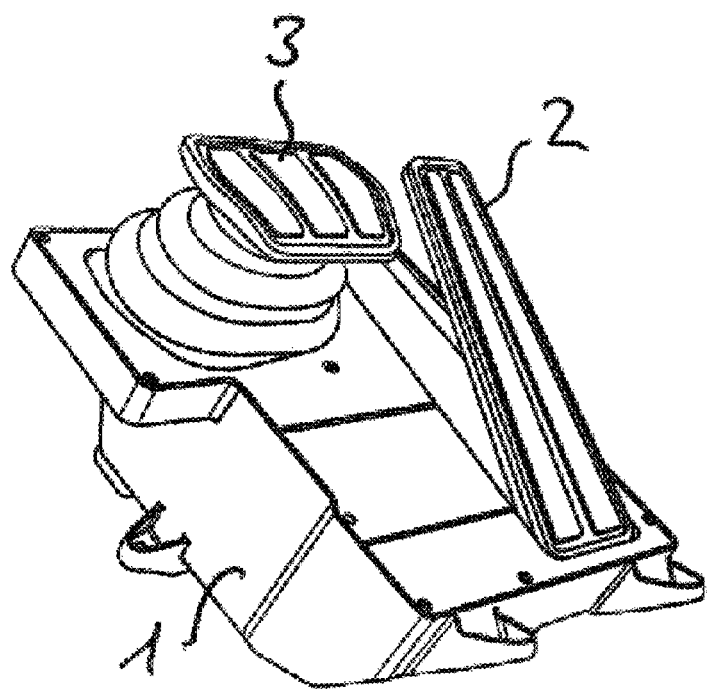

[Figure 9]
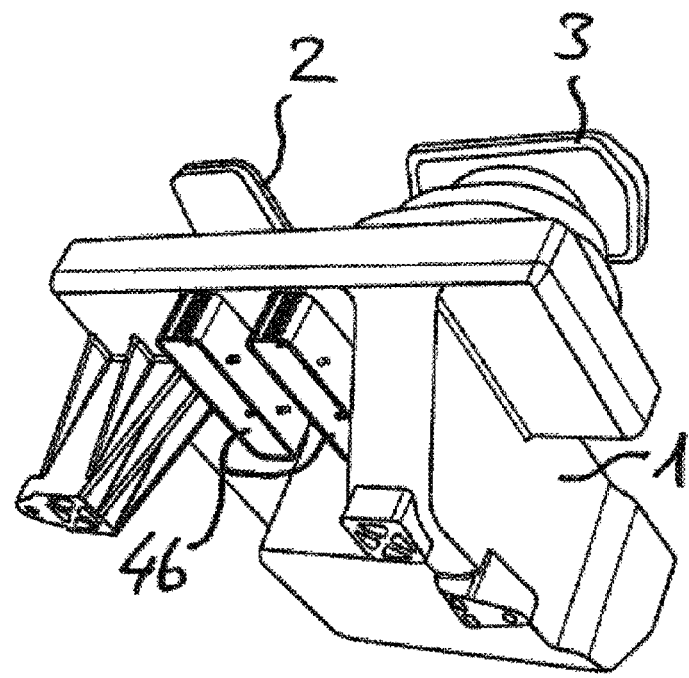

[Figure 10]
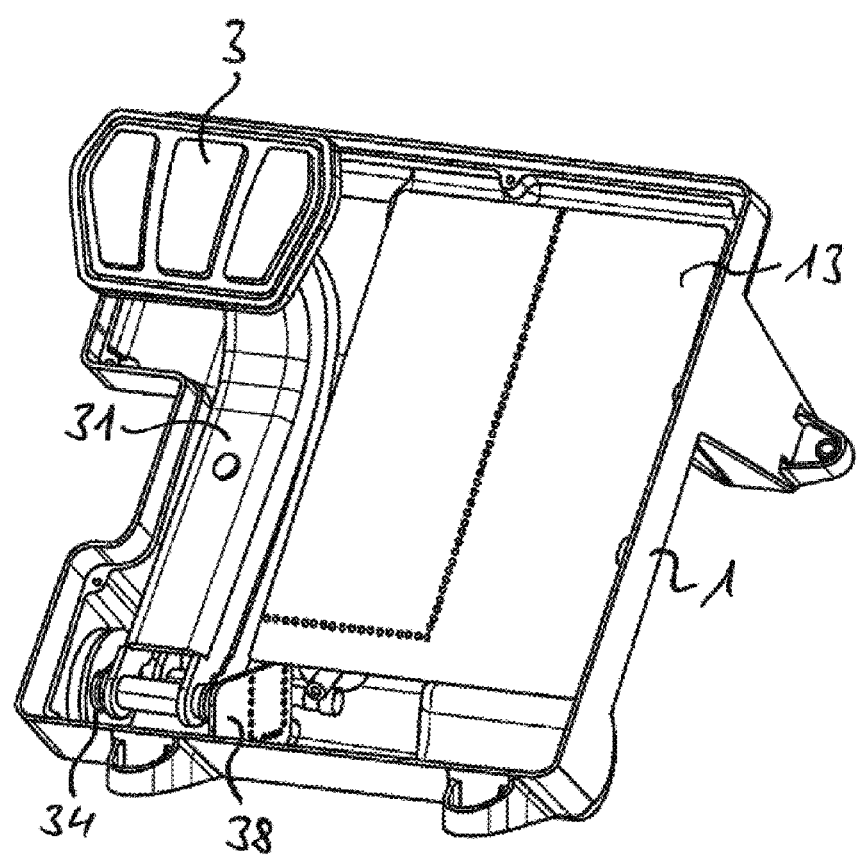

[Figure 11]
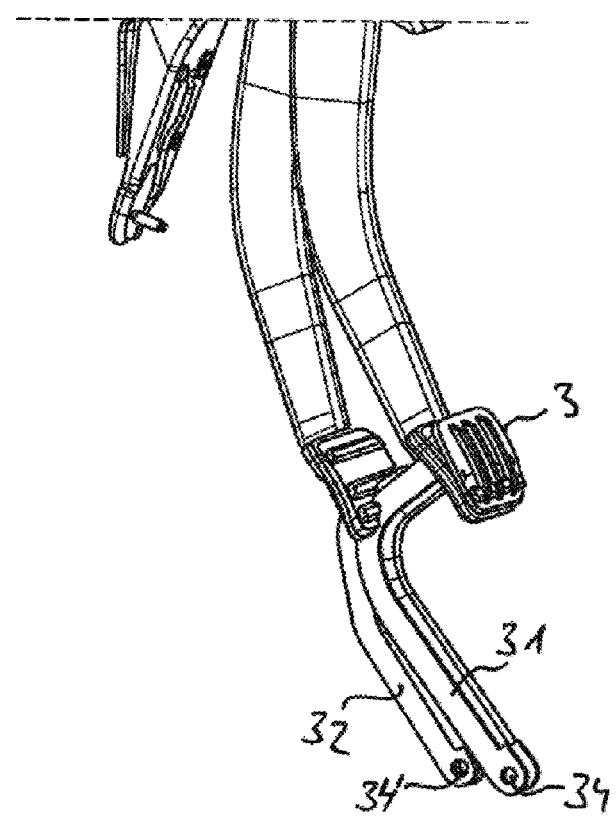

[Figure 12]
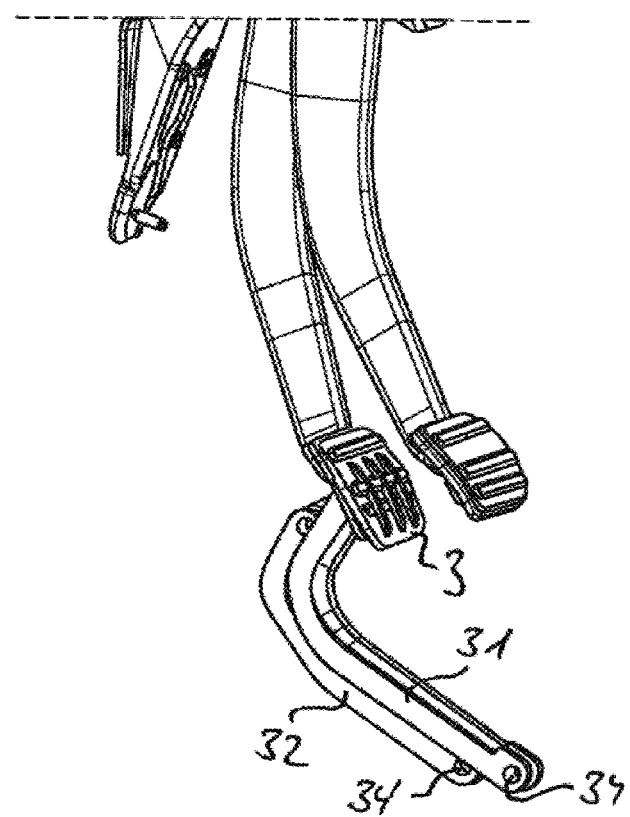

[Figure 13]
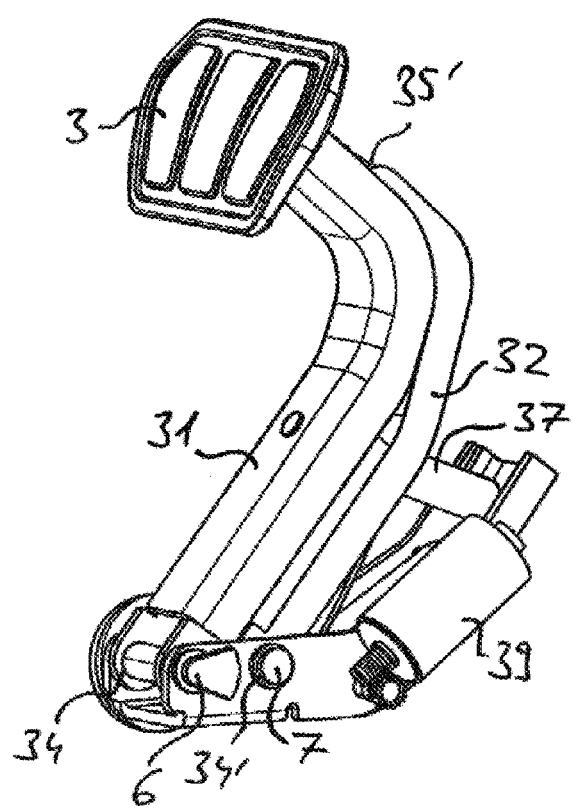

[Figure 14]
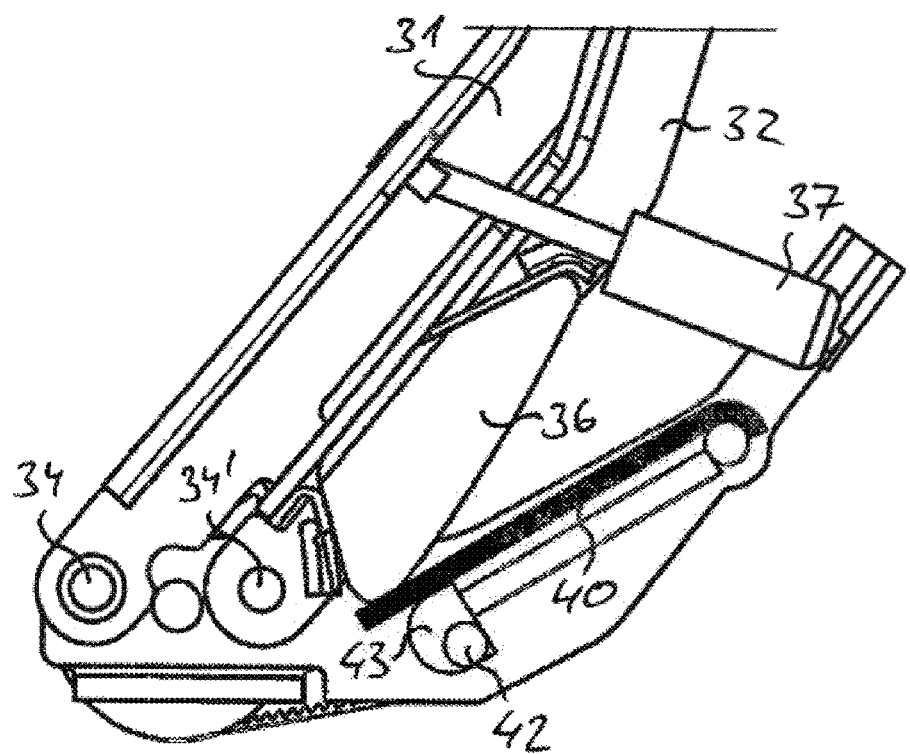

【Figure 15】
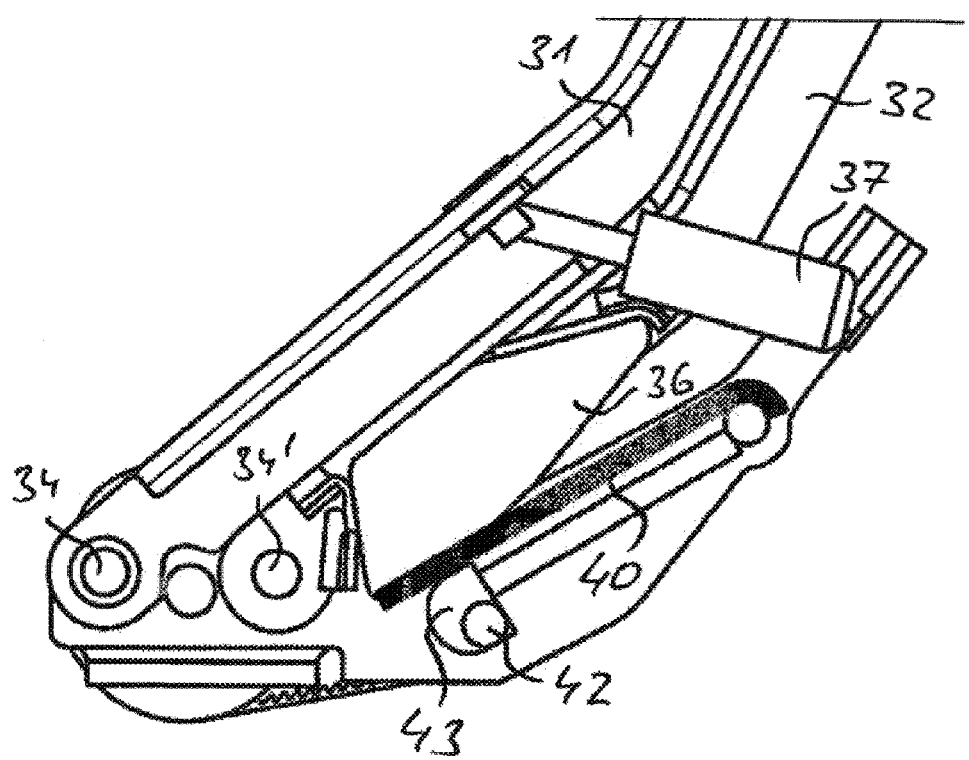

[Figure 16]
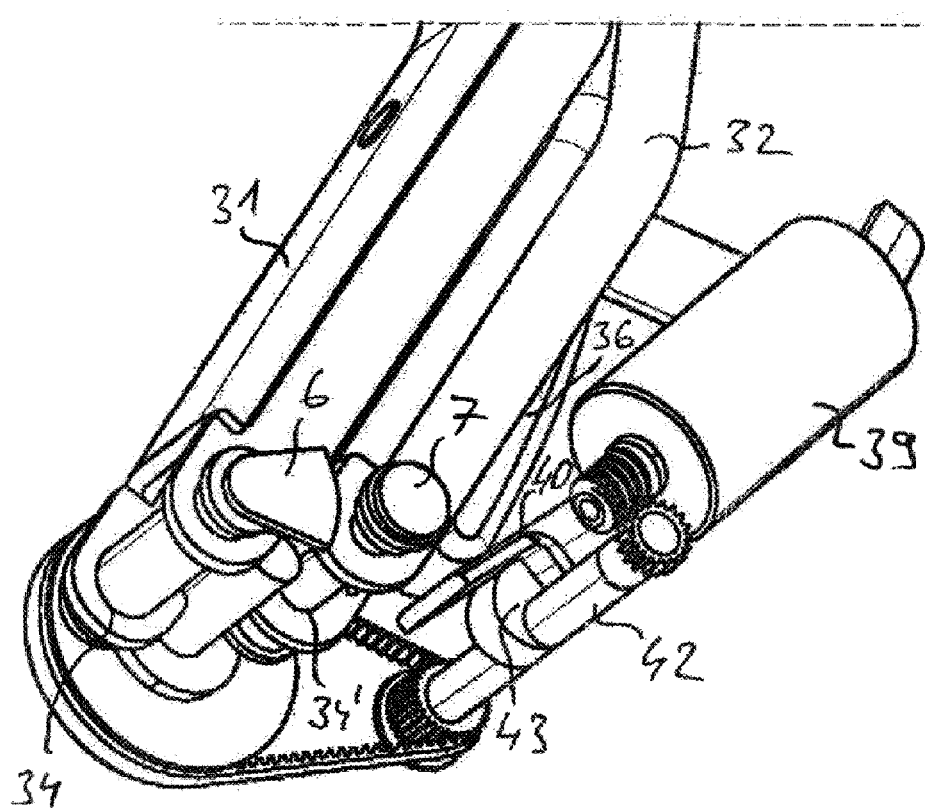

[Figure 17]
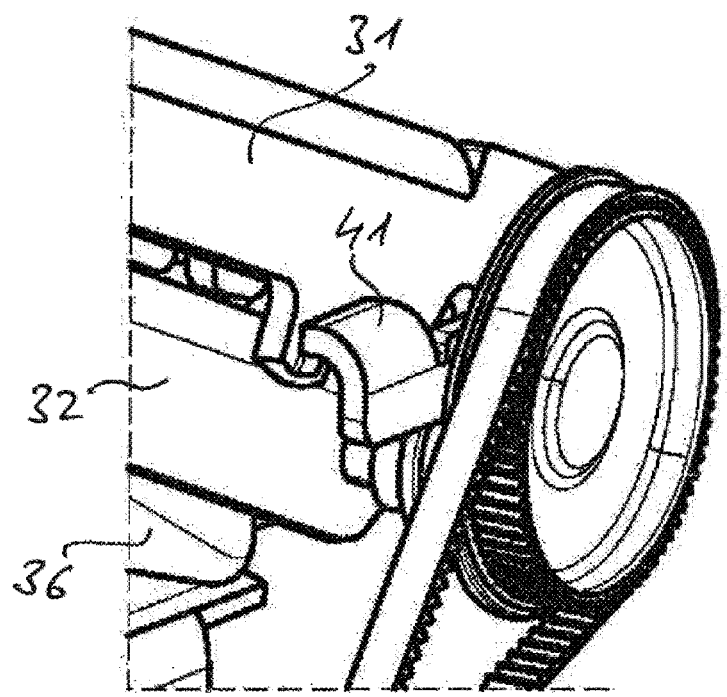

[Figure 18]
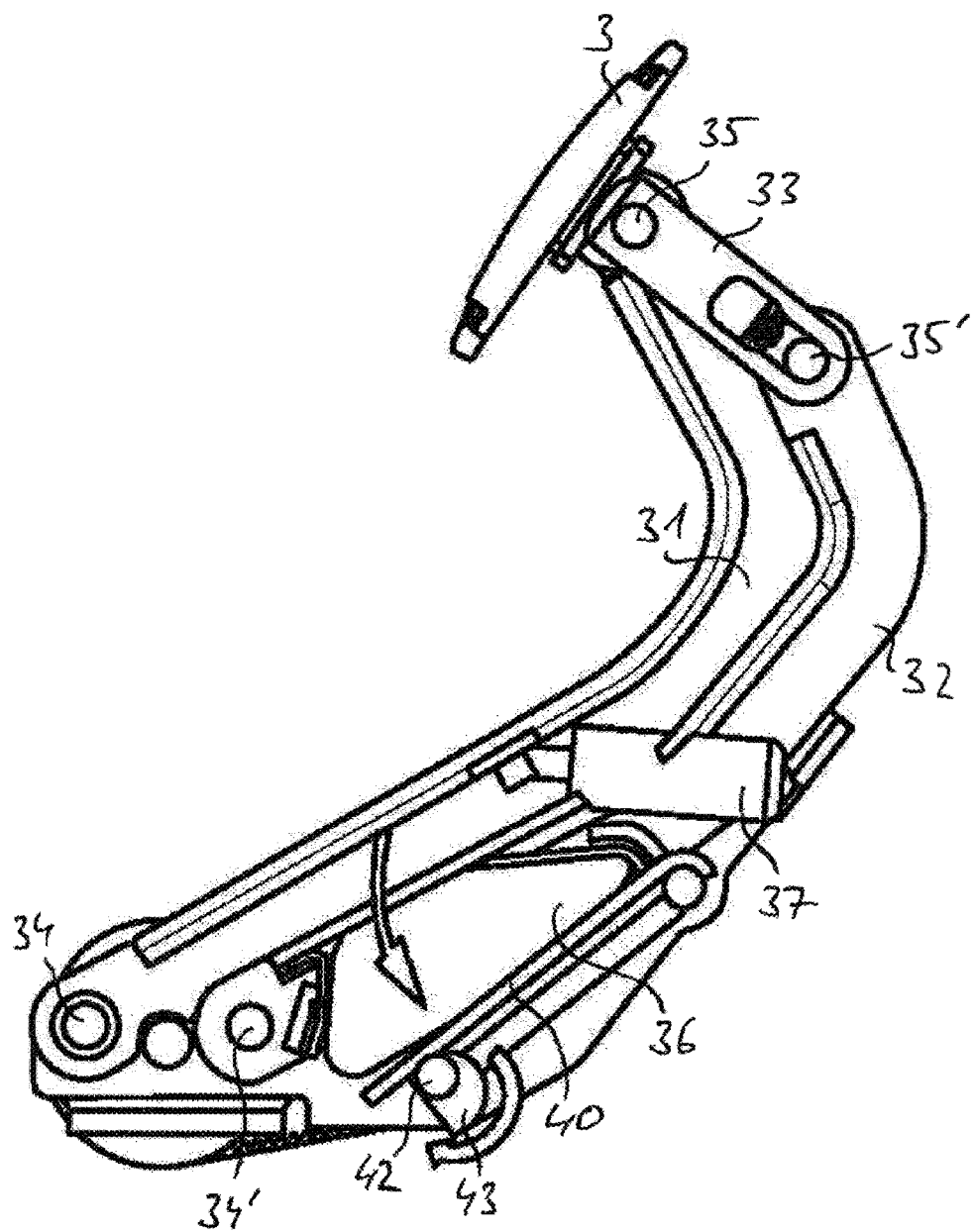

[Figure 19]
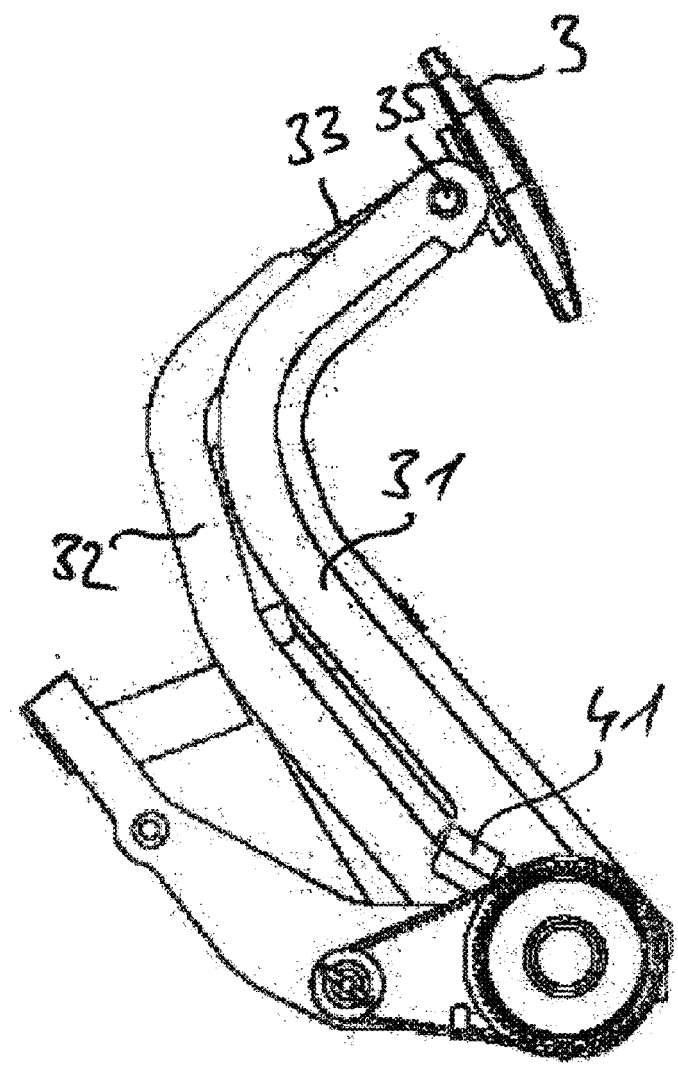

[Figure 20]
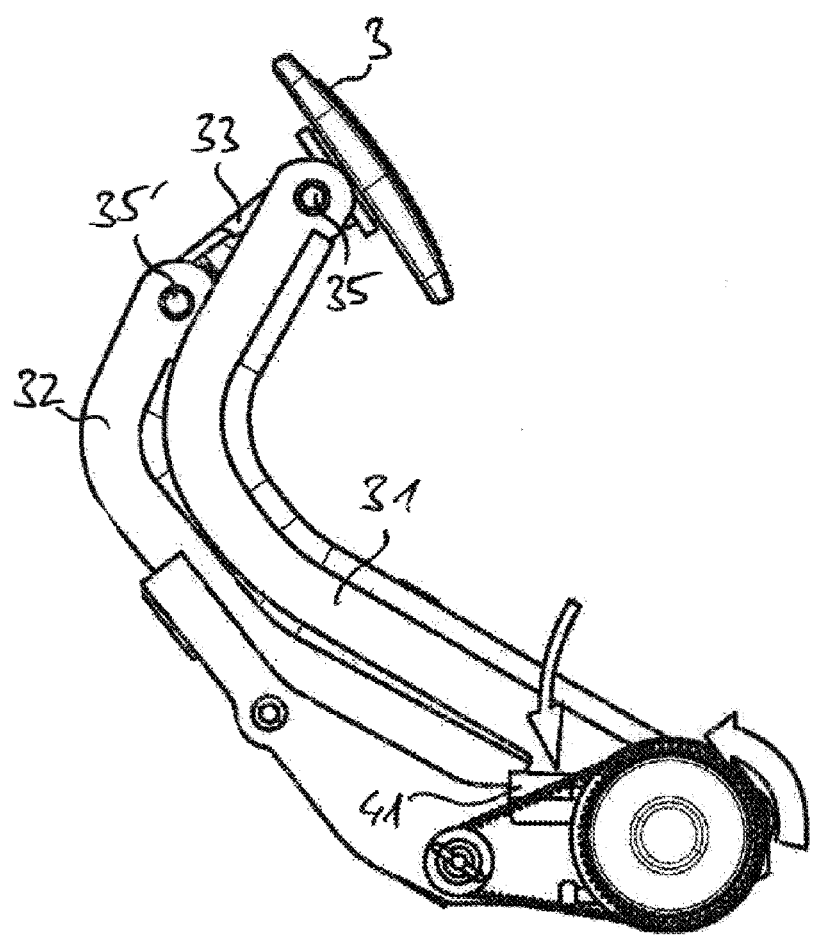

[Figure 21]
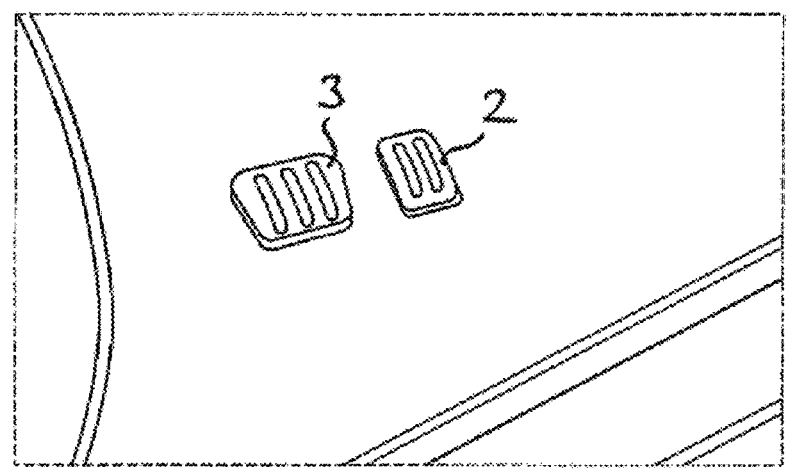

[Figure 22]
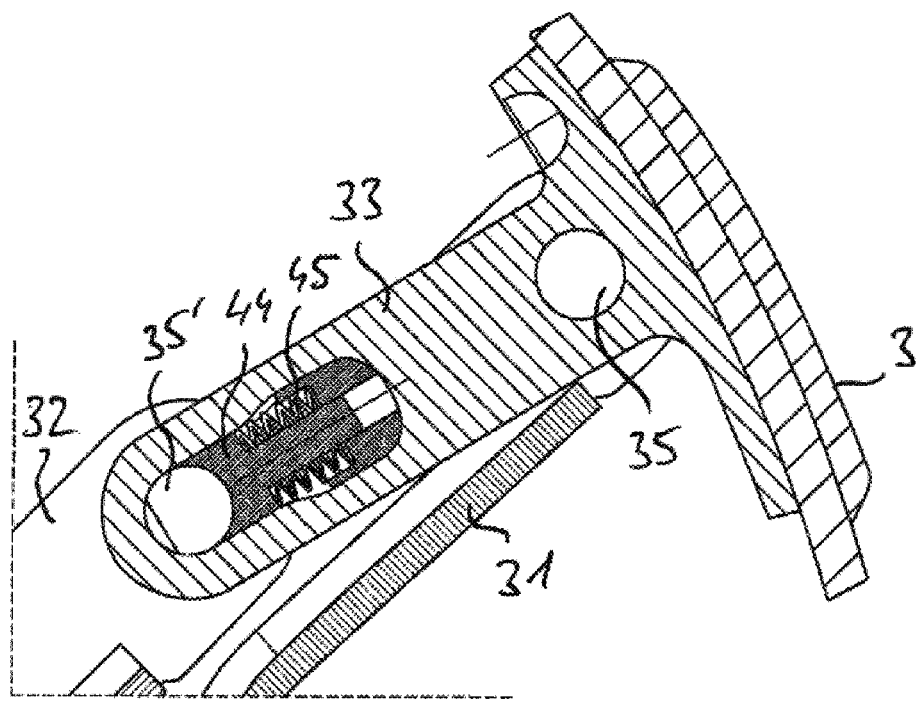

[Figure 23]
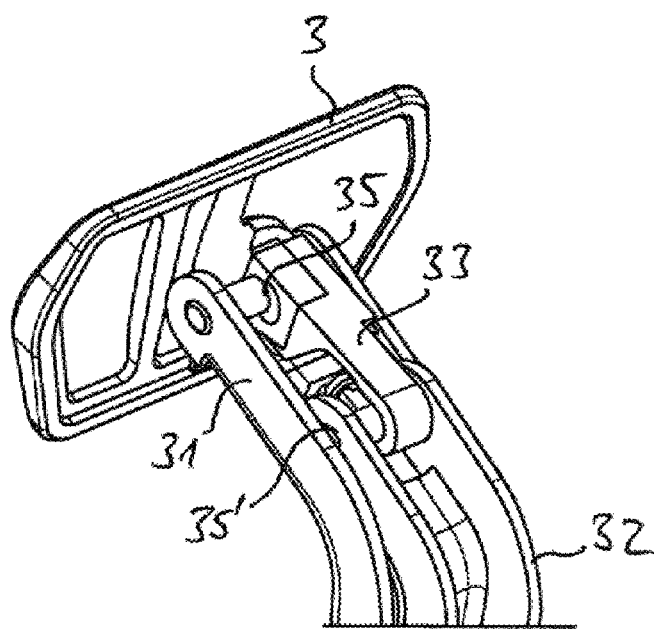

FLOOR MOUNTED BRAKE PEDAL

CROSS-REFERENCE TO RELATED APPLICATIONS

This application is the national stage of International Application No. PCT/KR2020/003152, filed on Mar. 6, 2020, which claims priority, under 35 U.S.C. 119(a), to German Patent Application No. 102019203089.0 filed in Germany on Mar. 6, 2019, 2019, the disclosure of which is incorporated by reference herein in its entirety.

TECHNICAL FIELD

The invention relates to a floor mounted brake pedal for an electrically controlled vehicle brake and to a corresponding brake pedal system.

BACKGROUND ART

Brake pedals for electrically controlled vehicle brakes, as such, are known from the prior art and sometimes called e-brake pedals. Disadvantages of known brake pedals of this type are their comparatively large space requirement and an unnatural pedal feel. Furthermore, their failure in case of a breakdown of a single component may be a safety-relevant issue

DISCLOSURE

Technical Problem

It is an object of the present invention to provide a brake pedal for an electrically controlled vehicle brake that requires only a small space for installation and an improved pedal feel and that avoids safety issues in view of possible failures.

Technical Solution

According to the invention, this is achieved by a floor mounted brake pedal for an electrically controlled vehicle brake according to the independent claim or by a brake pedal system according to claim 8. Embodiments may additionally show the features of the dependent claims.

The floor mounted brake pedal according to the invention comprises: a first pedal lever; a second pedal lever arranged in front of the first pedal lever; a pedal platform having a stepping area and a shaft protruding from the stepping area in a forward direction; a first pedal sensor for detecting a position of the brake pedal; and a second pedal sensor for independently detecting the position of the brake pedal, each of the first pedal lever and the second pedal lever being bottom-hinged by means of a first hinge at a bottom end and having a second hinge at a top end, the second hinge of the first pedal lever connecting the first pedal lever to the pedal platform and the second hinge of the second pedal lever connecting the second pedal lever to the shaft of the pedal platform in front of the second hinge of the first pedal lever.

Being a floor mounted brake pedal, it requires much less space than a comparable suspended or top-hinged pedal. On the other hand, the fact that the first and second hinges of the first pedal lever and the first and second hinges of the second pedal lever form a trapezoid or a tetragon close to a trapezoid has the effect that a movement of the brake pedal kinematically corresponds or is similar to a movement of an ordinary wall mounted or top-hinged brake pedal, which results in a natural pedal feel. In particular, the brake pedal may be designed such that the pedal platform moves along a more or less linear path when being pressed down. In view of the mentioned safety issues, redundancy is given by the second pedal sensor for detecting the position of the brake pedal independently from the first pedal sensor.

The two pedal sensors may but do not need to be of different types. Each of them may be a pedal stroke sensor or a pedal force sensor. At least one of them may be a Hall sensor or a magneto-resistive sensor.

In favour of the natural pedal feel, the floor mounted brake pedal may further comprise at least one of an elastic pedal feel simulator, for example a rubber element, supporting one of the first and second pedal levers or the pedal platform and a mechanical damping device connected to one of the first and second pedal levers or to the pedal platform.

Having the two independent pedal sensors, the floor mounted brake pedal does not need and, therefore, normally does not have any hydraulic master cylinder. The reason is that a sufficient redundancy is achieved by means of the two pedal sensors while also the desired pedal feel can be generated without a hydraulic master cylinder, in particular by means of an appropriate pedal feel simulator.

The first pedal sensor may be arranged at the bottom end of the first pedal lever, while the second pedal sensor may be arranged at the bottom end of the second pedal lever. This may increase an independence of the first and second pedal sensors.

The floor mounted brake pedal may further comprise a mechanism, for example a folding mechanism, for storing the pedal platform in a lower position in at least one of a parking mode and an autonomous driving mode by moving the second pedal lever to or towards a lower stop and thereby retracting the brake pedal. This makes sure that the brake pedal does not disturb a driver or vehicle occupant when it is not needed. The lower stop may but does not need to be given by an end stop directly contacting the second pedal lever. It may also be given, for example, by an element supporting the pedal feel simulator and thereby restricting a downward movement of the second pedal lever. An actuator may be used for storing the brake pedal by moving it to or towards the lower stop when desired.

In order to be more efficient in view of a space gain, the mechanism for storing the pedal platform may comprise a mechanism for moving the lower stop from a normal position to a lower position when the pedal platform is stored. To this end, the mechanism for storing the pedal platform may comprise a motor and a transmission connecting the motor with a driver engaging with one of the first and second pedal levers, the mechanism for moving the lower stop being given by a shaft of the transmission with an eccentric or cam supporting the lower stop.

In certain embodiments, a bearing of the second hinge of at least one of the first and second pedal levers is movable in a longitudinal direction of the shaft of the pedal platform and supported by a spring so that the pedal platform can still be moved over a reduced pedal travel when stored in the lower position by reducing a distance between the second hinge of the first pedal lever and the second hinge of the second pedal lever against a spring force of the spring supporting the said bearing. This has the effect that the brake pedal can still be used for brake commands even if it is stored in the lower position as a reduced pedal travel remains available even if the second pedal lever is moved to the lower stop. In this state, a movement of the brake pedal can still be detected by at least one of the pedal sensors. The option of such brake commands increases safety, for example when the brake pedal is stored for autonomous driving but needed in a case of emergency.

The suggested brake pedal system comprises a floor mounted brake pedal of the type described here and an electronic device for signal conditioning of sensor signals of the first and second pedal sensors and/or for generating a brake command signal based on the sensor signals, the electronic device comprising: a first signal processing unit for processing a sensor signal of the first pedal sensor representing a first pedal position value; and a second signal processing unit for independently processing a sensor signal of the second pedal sensor representing a second pedal position value.

A redundancy is given by the fact the second signal processing unit processes the sensor signal of the second pedal sensor independently from the first signal processing unit processing the sensor signal of the first pedal sensor. This makes sure that a single failure of either a pedal sensor or a signal processing unit does not result in a failure of the electrically controlled vehicle brake. In this context, it is helpful if the electronic device is configured for performing a plausibility check by comparing an output of the first signal processing unit and an output of the second signal processing unit. In particular, the electronic device may by configured for calculating a difference between the first pedal position value and the second pedal position value. This can be used for ensuring that only or primarily outputs of a properly functioning pedal sensor and a properly functioning signal processing unit are used for generating a brake command.

The brake pedal system may further comprise a pedal box accommodating at least the bottom ends of the first and second pedal levers including the first hinges as well as the first and second pedal sensors and the electronic device. The pedal feel simulator and the damping device may also be accommodated in the pedal box. This helps making the brake pedal system compact and space saving.

It is possible to install two pedal boxes of this kind in one vehicle, for example for driving school purposes.

The brake pedal system may further comprise an accelerator pedal mounted next to the brake pedal, and at least one accelerator pedal sensor for detecting a position of the accelerator pedal, the at least one accelerator pedal sensor being accommodated in the pedal box. In this case, the electronic device contained in the pedal box may further comprise a signal conditioning unit for processing sensor signals of the at least one accelerator pedal sensor.

The pedal box may have two connectors for connecting the first and second signal processing units and possibly the first and second pedal sensors to two independent power sources, each of the first signal processing unit and the second signal processing unit being connected or connectable to at least one of the two connectors.

Correspondingly, the brake pedal system may further comprise two independent power sources such as batteries for supplying electrical power to the first and second signal processing units, each of the first signal processing unit and the second signal processing unit being connected or connectable to at least one of the two power sources, the two power sources being an additional safety factor.

Normally, a service brake is controlled by the brake command signal which is generated by means of the said electronic device. Additionally, at least one of the first and second signal processing units may comprise a parking brake control unit for activating an electrical parking brake.

The brake pedal system may be used for activating a service brake including hydraulic wheel brakes, for example a integrated dynamic brake (IDB), preferably with two independent hydraulic actuators, or a service brake with electrical wheel brakes, for example brakes of the motor on caliper type.

The electronic device may further comprise at least one signal conditioning unit for processing sensor signals of one or more of vehicle dynamic sensors such as a yaw rate sensor or acceleration sensors, an outside temperature sensor and wheel speed sensors.

The at least one signal conditioning unit may also be configured for conditioning one or more of signals related to electrically actuated wheel brakes such as actuator currents, actuator position signals and clamping forces, brake light switch signals, parking brake switch signals, signals related to electrically actuated steer-by-wire systems such as steering wheel angle position signals, steering wheel adjustment position signals and steering wheel torque signals, signals of sensors of electrically actuated seats such as seat actuator positions and seat load signals, signals indicating electrically adjusted pedal positions, signals related to an electrically adjusted suspension such as suspension valve currents and signals of environmental sensors such as cameras, radar sensors and lidar sensors.

The electronic device may have a separate housing assembled with a housing of the brake pedal or it may be integrated in or part of the housing of the brake pedal, which in this case is also the housing of the electronic device. The housing of the brake pedal and a housing of the said pedal box may be identical. The housing of the electronic device may have two chambers which are climatically and electrically insulated from each other, one for each of the first signal processing unit and the second signal processing unit. The housing of the electronic device or the housing of the brake pedal may, for example, be made of plastic material or of aluminum material or of an aluminum plastic compound material and may by pressed or die-cast.

The first signal processing unit and the second signal processing unit may have different printed circuit boards, so that there is at least one separate printed circuit board for each of the two signal processing units. The printed circuit boards or some of them may communicate with each other by means of magnetic or optical coupling devices.

Advantageous Effects

Floor mounted brake pedal according to the various embodiments of the present invention may provide a brake pedal for an electrically controlled vehicle brake that requires only a small space for installation and an improved pedal feel and that avoids safety issues in view of possible failures.

DESCRIPTION OF DRAWINGS

The following figures show exemplary embodiments of the invention, wherein

FIG. 1 is a perspective view of a pedal box with a brake pedal system and an accelerator pedal, FIG. 2 is a block diagram illustrating an electronic device of the brake pedal system, FIG. 3 is a diagrammatic graphic illustrating an electrically controlled vehicle brake system including the pedal box with the brake pedal system and a hydraulic service brake as well as an electric parking brake, FIG. 4 is a diagrammatic graphic illustrating a different electrically controlled vehicle brake system including the same or a similar pedal box and service brake with electrical wheel brakes, FIG. 5 is a cross-sectional view of the pedal box of FIG. 1, FIG. 6 is another cross-sectional view of the same pedal box, FIG. 7 is a side view of the same pedal box, additionally showing a conventional brake pedal for comparison, FIG. 8 is a perspective view of an only slightly different pedal box with a brake pedal system and an accelerator pedal, FIG. 9 is another perspective view of this pedal box showing a bottom of the pedal box, FIG. 10 is a perspective view showing an inside of this pedal box, FIG. 11 is a perspective view of the brake pedal of one of the brake pedal systems in a rest position corresponding to a passive state, additionally showing a conventional brake pedal at rest and in a fully depressed state for comparison, FIG. 12 is a perspective view of the same brake pedal in a position corresponding to a fully depressed state, additionally showing the conventional brake pedal at rest and in the fully depressed state for comparison, FIG. 13 is a perspective view of the brake pedal an additional components of the brake pedal system shown in FIGS. 8 to 10, FIG. 14 is a cross-sectional view of a lower part of the same brake pedal in the rest position, FIG. 15 is a cross-sectional view of the lower part of the brake pedal in the fully depressed state, FIG. 16 is a perspective view of the lower part of the brake pedal including a mechanism for storing a pedal platform by moving the brake pedal into a lowermost stored position, FIG. 17 is a perspective view of a part of this mechanism, FIG. 18 is a cross-sectional view of the same brake pedal retracted in the stored position, FIG. 19 is a side view of the same brake pedal including the said mechanism for storing, the brake pedal being shown in the rest position, FIG. 20 is a side view of the same brake pedal including the said mechanism for storing, the brake pedal being the stored position, FIG. 21 is a perspective view of a vehicle footwell showing the pedal platform of the brake pedal as well as the accelerator pedal of the same brake pedal system, the brake pedal being the stored position, FIG. 22 is a cross sectional view of a top end of the same brake pedal including the pedal platform, and FIG. 23 is a perspective view of the top end of the same brake pedal.

BEST MODE

FIG. 1 shows a first embodiment of a pedal box 1 with a brake pedal system and an accelerator pedal 2. The brake pedal system includes a floor mounted brake pedal for an electrically controlled vehicle brake, which is mounted next to the accelerator pedal 2 and which has a stepping area 3. Furthermore, it includes an electronic device which is accommodated in the pedal box 1.

The electronic device of the brake pedal system or a part thereof is illustrated in FIG. 2 together with two batteries 4 as independent power sources and a chassis power supply control system 5 as well as a first pedal sensor 6 and a second pedal sensor 7. The pedal sensors 6 and 7 are configured for independently detecting a position of the brake pedal. In this particular example, the first pedal sensor 6 is a Hall sensor and the second pedal sensor 7 is a magneto-resistive sensor. Alternatively, the two pedal sensors 6 and 7, which are both accommodated in the pedal box 1, could also be of the same type. Each of them might be a pedal strake sensor or a pedal force sensor.

The electronic device is configured for signal conditioning of sensor signals of the first and second pedal sensors 6 and 7 and for generating or contributing to a brake command signal. The electronic device comprises a first signal processing unit 8 and a second signal processing unit 9, the first signal processing unit being configured for processing a sensor signal of the first pedal sensor 6 representing a first pedal position value and the second signal processing unit 9 being configured for independently processing a sensor signal of the second pedal sensor 7 representing a second pedal position value. Each of the first signal processing unit 8 and the second signal processing unit 9 contains a power supply circuit 10 connected to one of the two batteries 4 so that the batteries 4 can independently supply electrical energy to the first and second signal processing units 8 and 9 and to the first and second sensors 6 and 7. Each of the first and second signal processing units 8 and 9 is compliant with the automotive safety integrity level D safety requirements (ASIL D). To this end, each of them comprises two independent microcontrollers 11 and a voting circuit 12 for processing outputs of the two microcontrollers 11. The two signal processing units 8 and 9 may be implemented on one single printed circuit board 13. Alternatively, they may have different printed circuit boards, so that there is at least one separate printed circuit board for each of the two signal processing units 8 and 9. In that case, the printed circuit boards or some of them may communicate with each other by means of magnetic or optical coupling devices.

The electronic device is configured for performing a plausibility check by comparing an output 14 of the first signal processing unit 8 and an output 15 of the second signal processing unit 9. This may be done, for example, by calculating a difference between the first pedal position value or a parameter derived therefrom and the second pedal position value or a parameter derived therefrom.

The pedal box 1 also houses one or two accelerator pedal sensors for detecting a position of the accelerator pedal 2. For processing sensor signals of the at least one accelerator pedal sensor, the electronic device further comprises a signal conditioning unit contained in the pedal box 1.

Normally, a service brake is controlled by the brake command signal which is generated by means of the electronic device. In addition, the second signal processing unit 9 comprises a parking brake control unit for activating an electrical parking brake by supplying an activating current via electrical connections 16 to a motor on caliper type parking brake of a left and of a right rear wheel of a vehicle which is equipped with the brake pedal system.

The electronic device may have a separate housing assembled with a housing of the brake pedal or it may be integrated in or part of the housing of the brake pedal, which in this case is also the housing of the electronic device. The housing of the brake pedal may be a housing of the said pedal box 1 or a part thereof. The housing of the electronic device may have two chambers which are climatically and electrically insulated from each other, one for each of the first signal processing unit 8 and the second signal processing unit 9. The housing of the electronic device or the housing of the brake pedal may, for example, be made of plastic material or of aluminum material or of an aluminum plastic compound material and may by pressed or die-cast.

The electronic device may further comprise signal conditioning units for processing sensor signals of one or more of vehicle dynamic sensors such as a yaw rate sensor or acceleration sensors, an outside temperature sensor and wheel speed sensors. The signal conditioning units may also be configured for conditioning one or more of signals related to electrically actuated wheel brakes such as actuator currents, actuator position signals and clamping forces, brake light switch signals, parking brake switch signals, signals related to electrically actuated steer-by-wire systems such as steering wheel angle position signals, steering wheel adjustment position signals and steering wheel torque signals, signals of sensors of electrically actuated seats such as seat actuator positions and seat load signals, signals indicating electrically adjusted pedal positions, signals related to an electrically adjusted suspension such as suspension valve currents and signals of environmental sensors such as cameras, radar sensors and lidar sensors.

Additionally, the electronic device of this or any other embodiment may comprise data processing circuits for controlling different functions, for example one or more of the following:
- data processing circuits for a brake control including one ore more of a parking brake control, a service brake control, an emergency brake control, a wheel slip control and a vehicle dynamics control by means of individual torque vectoring,
- data processing circuits for a traction control,
- data processing circuits for a steer-by-wire control, possibly including at least one of a steering feel actuator control, a steering wheel adjustment control and a wheel actuator control,
- data processing circuits for a suspension control such as a semi-active or active suspension control,
- data processing circuits for a vehicle speed control
- data processing circuits for a driving direction control,
- data processing circuits for a distance control and for emergency detection.

Additionally, the electronic device of this or any other embodiment may comprise drivers for different components, for example one or more of the following: drivers for brake actuators, drivers for suspension valves, drivers for level control actuators, drivers for steering feel actuators, drivers for vibration actuators. It may also be connected to external servers via Ethernet or used as a central server for other hubs in a vehicle which is equipped with the brake pedal system.

FIG. 3 shows an electrically controlled vehicle brake system including the pedal box 1 and the service brake, which is a hydraulic brake in this case, as well as the electric parking brake. Here and in the following figures, the same or corresponding features are always indicated using the same reference signs. In this case, the service brake, which can be activated by the brake pedal system, is an integrated dynamic brake (IDB) comprising a subsystem 17 with a primary control unit 18 including a first hydraulic actuator and a redundant control unit 19 (RCU) including a second hydraulic actuator. Each of the primary control unit 18 and the redundant control unit 19 is supplied with electrical power by one of the batteries 4. The hydraulic service brake is activated depending on an output of the pedal box 1 and on sensor signals of four wheel speed sensors 20. These sensor signals are also used as a further input 21 of the electronic device of the brake pedal system, the input 21 representing a reference speed. Normally, each of two hydraulic front wheel brakes 22 and two hydraulic rear wheel brakes 23 of the vehicle are activated by the hydraulic actuator of the primary control unit 18 depending on the brake command signal which is generated by means of the brake pedal system in the pedal box 1. If, for any reason, the primary control unit 18 or its hydraulic actuator fails, at least the hydraulic front wheel brakes 22 can be activated by the hydraulic actuator of the redundant control unit 19 instead. The parking brake, which can be activated by the electronic device of the brake pedal system as described above, is normally activated by means of the primary control unit 18 via electrical connections, while this is done by the electronic device of the brake pedal system only if the primary control unit 18 or its power supply fails.

FIG. 4 shows a different electrically controlled vehicle brake system including the same or a similar pedal box 1 and a service brake. The main difference is that the service brake, which can be activated by the brake pedal system, has two electrical front wheel brakes 22' and two electrical rear wheel brakes 23' instead of the hydraulic front and rear wheel brakes 22 and 23. In this case, all four wheel brakes 22' and 23' are of the motor on caliper type, while the electrical rear wheel brakes 23' are also used as a parking brake which can be activated by pressing a parking brake button 24 or by moving a selection lever 25 to "P".

Compared to the embodiment shown in FIG. 3, another difference is that, in the embodiment shown in FIG. 4, each of the first signal processing unit 8 and second signal processing unit 9 has their own printed circuit boards and that each of the two signal processing units 8 and 9 comprises a parking brake control unit 26 implemented on a separate printed circuit board for activating the electrical parking brake, the control units 26 receiving a parking brake activation command in form of a pulse width modulated signal. The electrical wheel brakes 22 and 23' are provided with position sensors 27 and can communicate with the brake pedal system and with a chassis communication bus 28 via communication lines 29. The rear wheel brakes 23' are activate by an activating current via the electrical connections 16. Similarly, actuators of the electrical front wheel brakes 22' are supplied with electrical energy via electrical connections 16'.

Finally, in this embodiment, each of the two signal processing units 8 and 9 can be connected to and supplied by each of the two batteries 4. The battery 4 in use can be selected by a switching circuit 30 of the electronic device.

In the cross-sectional view of the pedal box 1 shown in FIG. 5, details of the floor mounted brake pedal according to the first embodiment can be seen. The brake pedal comprises a first pedal lever 31, a second pedal lever 32 arranged in front of the first pedal lever 31, and a pedal platform comprising the stepping area 3 and a shaft 33 protruding from the stepping area 3 in a forward direction.

The first pedal sensor 6 for detecting the position of the brake pedal is arranged at a bottom end of the first pedal lever 31. Similarly, the second pedal sensor 7 for independently detecting the position of the brake pedal is arranged at a bottom end of the second pedal lever 32.

Each of the first pedal lever 31 and the second pedal 32 lever are bottom-hinged by means of a first hinge 34, 34' at its bottom end and has a second hinge 35, 35' at a top end. The second hinge 35 of the first pedal lever 31 connects the first pedal lever 31 to the pedal platform and the second hinge 35' of the second pedal lever 32 connects the second pedal lever 32 to the shaft 33 of the pedal platform in front of the second hinge 35 of the first pedal lever 31 so that the first and second hinges 34, 35 of the first pedal lever 31 and the first and second hinges 34', 35' of the second pedal lever 32 form a trapezoid or a tetragon close to a trapezoid.

Furthermore, the floor mounted brake pedal comprises a rubber element 36, which supports the second pedal lever 32, as an elastic pedal feel simulator as well as a mechanical damping device 37 connected to the stepping area 3 of the pedal platform.

FIG. 6 shows a similar cross-sectional view of the same pedal box 1. This drawing shows how the printed circuit board 13 carrying at least parts of both signal processing units 8 and 9 is arranged in a housing of the pedal box 1. As can be seen in FIGS. 5 and 6, the housing of the pedal box 1 accommodates, in particular, the bottom ends of the first and second pedal levers 31 and 32 including the first hinges 34 and 34' as well as the first and second pedal sensors 6 and 7, the said electronic device, the pedal feel simulator and at least a part of the damping device 37.

FIG. 7 shows a side view of the same pedal box 1 and, additionally, a side view of a conventional suspended brake pedal for comparison. Here, the floor mounted brake pedal is shown in a stored position. FIG. 7 shows that the pedal box including the floor mounted brake pedal requires much less space than the conventional top-hinged brake pedal.

FIGS. 8 and 9 show a second embodiment of a pedal box 1 with an accelerator pedal 2 and with a brake pedal system including a floor mounted brake pedal. The second embodiment differs only slightly from the first embodiment described before. As can be seen in FIG. 9, this pedal box 1 has two connectors 46 for connecting the first and second signal processing units 8 and 9 as well as the first and second pedal sensors 6 and 7 to the two independent power sources and to any other component communicating with the pedal box 1.

FIG. 10 shows an inside of this pedal box 1 and the floor mounted brake pedal which has a structure similar to the brake pedal of the first embodiment. A small printed circuit board 38, which is separated into two independent units, carries the first pedal sensor 6 at the bottom end of the first pedal lever 31 and the second pedal sensor 7 at the bottom end of the second pedal lever 32. At least parts of the first and second signal processing units 8 and 9 may be implemented on this printed circuit board 38. Remaining parts of the electronic device are implemented on a larger printed circuit board 13, which is also separated into two independent units.

FIG. 11 shows the floor mounted brake pedal according to the first or the second embodiment in a rest position corresponding to a passive state, additionally showing the conventional top-hinged brake pedal at rest and in a fully depressed state for comparison. Similarly, FIG. 12 shows the same floor mounted brake pedal in a position corresponding to a fully depressed state, again additionally showing the conventional brake pedal at rest and in the fully depressed state. FIGS. 11 and 12 show that a movement of the floor mounted brake pedal with the two pedal levers 31 and 32 and the four hinges 34, 34', 35, 35' kinematically corresponds or is very similar to a movement of an ordinary suspended or wall mounted brake pedal.

FIG. 13 shows the floor mounted brake pedal according to the second embodiment and a motor 39 of a mechanism for storing the pedal platform in a lower position in a parking mode or in an autonomous driving mode.

FIG. 14 is a cross-sectional view of a lower part of the same brake pedal in the rest position, while FIG. 15 shows the lower part of the brake pedal in the fully depressed state. In the fully depressed state, the rubber element 36 simulating a familiar pedal feel is compressed. A movement of the brake pedal downward is limited by a lower stop 40 supporting the rubber element 36. In this embodiment, the damping device 37 is connected to the first pedal lever 31.

As already indicated, the floor mounted brake pedal comprises a mechanism for storing the pedal platform in a lower position for parking or for autonomous driving. This is done by moving the second pedal lever 32 to or towards the lower stop by means of an actuator including the motor 39.

The mechanism for storing the pedal platform is shown in more detail in FIGS. 16 to 19. It comprises a mechanism for moving the lower stop 40 from a normal position, which can be seen in FIGS. 14 and 15, to an even lower position when the pedal platform is stored. FIG. 18 shows the brake pedal retracted in the stored position and the lower stop 40 in its lowest position. The mechanism for storing the pedal platform comprises the motor 39 and a transmission connecting the motor 39 with a driver 41, which can be seen in FIGS. 17, 19 and 20 and which engages with one of the first and second pedal levers 31, 32 for pressing the second pedal lever 32 down when the brake pedal or its pedal platform is to be stored. This is shown in FIG. 20. The mechanism for moving the lower stop 40 is given by a shaft 42 of the said transmission with an eccentric or cam 43 supporting the lower stop 40.

FIG. 21 shows the pedal platform of the brake pedal as well as the accelerator pedal of the same brake pedal system in a footwell of the vehicle which is equipped with the brake pedal system including the retractable floor mounted brake pedal, the brake pedal being retracted in the stored position.

FIGS. 22 and 23 show a top end of the same brake pedal including the pedal platform and the top ends of the first pedal lever 31 and the second pedal lever 32. As can be see here, a bearing 44 of the second hinge 35' of the second pedal lever 32 is movable in a longitudinal direction of the shaft 33 of the pedal platform and supported by a stiff spring 45. This has the effect that the pedal platform can still be moved over a reduced pedal travel even when it is stored in the lower position. When the brake pedal is depressed in this state, the distance between the second hinge 35 of the first pedal lever 31 and the second hinge 35' of the second pedal lever 32 is reduced against a spring force of the spring 45. If this is done, for example in a case of emergency when the vehicle is driving autonomously, the remaining movement of the pedal platform results in a movement of the first pedal lever 31 and, thus, can be detected by means of the first pedal sensor 6. This results in a sensor signal of the first pedal sensor 6 which can be processed by the electronic device in order to generate an emergency braking command.

The invention claimed is:

1. A floor mounted brake pedal for an electrically controlled vehicle brake, comprising:
 a first pedal lever;
 a second pedal lever arranged in front of the first pedal lever;
 a pedal platform having a stepping area and a shaft protruding from the stepping area in a forward direction;
 a first pedal sensor for detecting a position of the brake pedal; and
 a second pedal sensor for independently detecting the position of the brake pedal,
 each of the first pedal lever and the second pedal lever being bottom-hinged by means of a first hinge at a bottom end and having a second hinge at a top end, the second hinge of the first pedal lever connecting the first pedal lever to the pedal platform, and the second hinge of the second pedal lever connecting the second pedal lever to the shaft of the pedal platform in front of the second hinge of the first pedal lever.

2. The floor mounted brake pedal of claim 1, further comprising at least one of an elastic pedal feel simulator supporting one of the first and second pedal levers or the pedal platform and a mechanical damping device connected to one of the first and second pedal levers or to the pedal platform.

3. The floor mounted brake pedal of claim 1, wherein the first pedal sensor is arranged at the bottom end of the first pedal lever and the second pedal sensor is arranged at the bottom end of the second pedal lever.

4. The floor mounted brake pedal of claim 1, further comprising a mechanism for storing the pedal platform in a lower position in at least one of a parking mode and an autonomous driving mode by moving the second pedal lever to or towards a lower stop.

5. The floor mounted brake pedal of claim 4, wherein the mechanism for storing the pedal platform comprises a mechanism for moving the lower stop from a normal position to a lower position when the pedal platform is stored.

6. The floor mounted brake pedal of claim 5, wherein the mechanism for storing the pedal platform comprises a motor and a transmission connecting the motor with a driver engaging with one of the first and second pedal levers, the mechanism for moving the lower stop being given by a shaft of the transmission with an eccentric or cam supporting the lower stop.

7. The floor mounted brake pedal of claim 4, wherein a bearing of the second hinge of at least one of the first and second pedal levers is movable in a longitudinal direction of the shaft of the pedal platform and supported by a spring so that the pedal platform can still be moved over a reduced pedal travel when stored in the lower position by reducing a distance between the second hinge of the first pedal lever and the second hinge of the second pedal lever against a spring force of the spring supporting the said bearing.

8. A brake pedal system comprising the floor mounted brake pedal of claim 1 and an electronic device for at least one of signal conditioning of sensor signals of the first and second pedal sensors and generating a brake command signal, the electronic device comprising:

a first signal processing unit for processing a sensor signal of the first pedal sensor representing a first pedal position value; and
a second signal processing unit for independently processing a sensor signal of the second pedal sensor representing a second pedal position value.

9. The brake pedal system of claim 8, wherein the electronic device is configured for performing a plausibility check by comparing an output of the first signal processing unit and an output of the second signal processing unit.

10. The brake pedal system of claim 9, further comprising two independent power sources for supplying electrical power to the first and second signal processing units, each of the first signal processing unit and the second signal processing unit being connected or connectable to at least one of the two power sources.

11. The brake pedal system of claim 8, further comprising a pedal box accommodating the bottom ends of the first and second pedal levers including the first hinges as well as the first and second pedal sensors and the electronic device.

12. The brake pedal system of claim 11, further comprising an accelerator pedal mounted next to the brake pedal, and at least one accelerator pedal sensor for detecting a position of the accelerator pedal, the at least one accelerator pedal sensor being accommodated in the pedal box.

13. The brake pedal system of claim 11, wherein the pedal box has two connectors for connecting the first and second signal processing units to two independent power sources, each of the first signal processing unit and the second signal processing unit being connected or connectable to at least one of the two connectors.

14. The brake pedal system of claim 8, further comprising two independent power sources for supplying electrical power to the first and second signal processing units, each of the first signal processing unit and the second signal processing unit being connected or connectable to at least one of the two power sources.

15. The brake pedal system of claim 8, wherein at least one of the first and second signal processing units comprises a parking brake control unit for activating an electrical parking brake.

* * * * *